Patented Sept. 3, 1946

2,407,143

UNITED STATES PATENT OFFICE 2,407,143

ADHESIVES AND A PROCESS OF PRODUCING SAME

Theodor Daur, Mannheim, and Walter Daniel, Ludwigshafen-on-the-Rhine, Germany; vested in the Alien Property Custodian No Drawing. Application April 4, 1941, Serial No. 386,860. In Germany April 30, 1940

3 Claims. (Cl. 260—4)

The present invention relates to new adhesives and a process of producing same.

Solutions of film-forming adhesive substances, for example of natural or synthetic resin, rubber or polyvinyl compounds in a monomeric polymerizable substance, for example in monovinyl compounds, such as monomeric styrene, vinyl esters, acrylic or methacrylic esters, chlorobutadiene or dimethylbutadiene, are known to be suitable as adhesives for joining materials. The said solutions are applied to the surfaces to be cemented together, the surfaces are contacted and the monomeric compounds are polymerized. The polymerization of the monomeric compound may be accelerated by heating and/or by adding a known polymerization catalyst, especially peroxides, for example benzoylperoxide, or persulphates. A strong and lasting joint between the cemented parts is thus obtained; since it is not necessary to remove volatile constituents (as is the case if adhesives dissolved in volatile non-polymerizing solvents are used), no formation of blisters and voids in the cementing layer occurs.

Solutions of film-forming adhesive substances in polymerizable solvents possess, however, but a limited storage capacity in view of the tendency of such solvents to polymerize. Frequently partial polymerization of the monomeric solvent takes place already after about 2 to 3 weeks or, depending on the temperature, after a longer time, causing the adhesive solution to solidify to such a degree as to make it unsuitable for being spread. Since the adhesive solution, on the other hand, is required to solidify comparatively quickly in use, solvents which are easily polymerized must necessarily be employed, so that the lack of sufficient storage capacity cannot be overcome by resorting to substances which are somewhat more difficult to polymerize.

The polymerization of vinyl compounds, as is known, may be prevented or highly retarded by the addition of stabilizing media, for example compounds containing nitrogen, oxygen or sulphur, such as aniline, pyrogallol, hydroquinone and mercaptans. These stabilizing media, however, must be removed again when the vinyl compounds so stabilized are to be polymerized. Since practically all of the known stabilizing media are high-boiling substances, the stabilizer either must be washed out, for example with acid or lye, or the vinyl compound must be distilled. Such measures, however, are not applicable to adhesive solutions or are much too troublesome.

We have now found that adhesive solutions comprising organic adhesive substances in liquid polymerizable compounds can be excellently stabilized by adding thereto small amounts of readily volatile compounds containing nitrogen, oxygen or sulphur, as stabilizing agents. These substances prevent the adhesive solutions from undesired premature solidification, but evaporate very quickly when the adhesive solutions are applied and leave the polymerizable compound in a readily polymerizable state. The evaporation of the stabilizing agent may be promoted by gentle heating, if desired, the polymerization of the polymerizable compounds being simultaneously accelerated. In many cases, however, the stabilizers evaporate already completely when the adhesive solutions are applied, so that no additional measures are needed.

Suitable readily volatile stabilizing media are compounds containing nitrogen, oxygen or sulphur boiling below about 40° C., such as for example, acetaldehyde, ethylamine, ammonia, hydrogen sulphide, methyl and ethyl mercaptan. The said stabilizing agents are added in small amounts. Additions of less than 0.1 per cent are often sufficient to render the adhesive solutions sufficiently stable. The adhesive solutions should, of course, be kept and stored in well-closed receptacles, lest the stabilizing media should escape prematurely. In special cases higher percentages of the stabilizing media than 0.1 per cent may also be employed, for example 0.5 or 1 per cent or up to 5 per cent.

It is preferable to add in known manner polymerization accelerators to the adhesive solutions prior to the use, for example about 2 per cent of benzoylperoxide. Excellent joints are obtained by means of the new adhesives in a short time.

The following example serves to illustrate how the present invention may be carried out in practice but the invention is not restricted to this example. The parts are by weight.

Example 10 parts by weight of a rubber conversion product (obtained by the action of phosphorus oxychloride on natural rubber) are dissolved in 90 parts by weight of monomeric styrene. Portions of the adhesive solution thus obtained are stabilized each with one of the highly volatile stabilizing media listed below, and allowed to stand for 50 hours at 20° C. in closed vessels. 5 grams of each solution was then diluted with 100 cubic centimeters of carbon tetrachloride and the diluted solutions were tested in the Ubbelohde viscosimeter. By way of comparison two samples of the same solution of rubber conversion product in monomeric styrene without a stabilizer were tested in the same manner (diluted with carbon tetrachloride), one sample directly after its preparation and the other after 50 hours' standing at 20° C. in a closed vessel. The solution without stabilizer after standing has polymerized to such an extent as to be no longer soft enough for being spread. The data for the fluidity of all the solutions tested in the Ubbelohde viscosimeter can be seen from the following table:

| Solution | Stabilizer | Quantity of stabilizer | Time of flow |
|---|---|---|---|
| | | | Seconds |
| Fresh | None | | 133.8 |
| After 50 h. at 20° C. | do | | 316.6 |
| Do | Acetaldehyde | 2 drops per 100 grams of adhesive solution | 242.0 |
| Do | Conc. aqueous ammonia | do | 164.0 |
| Do | Ethylamine | do | 162.7 |

The solution added with one of the afore-mentioned stabilizers and admixed with 2 per cent of benzoyl peroxide was applied to a sheet of highly polymerized isobutylene in which a filler has been incorporated. The sheet is then placed on a sheet iron plate, which has likewise been brushed with the adhesive solution, and slightly pressed on. After 2 days the parts so cemented together have become so strongly joined that it would mean destruction to the sheet to detach it from its support. An unstabilized adhesive solution of otherwise the same composition takes the same time to harden.

Equally good results are obtained with solutions of 30 parts of chloro-rubber in 70 parts of monomeric styrene or of 20 parts of colophony in 80 parts of monomeric styrene or of 30 parts of polymeric isobutylene (molecular weight about 30,000) in 70 parts of monomeric styrene, while adding about 0.1 per cent of monoethylamine as a stabilizer. It is advantageous to add to the solution before use about 2 per cent of benzoyl peroxide; then the solution yields very strong and lasting joints within 2 days at ordinary temperature. Sheets or films from artificial masses, paper, tissue, wood, metals and stone may thus be well joined to one another.

Instead of styrene, β-chlorbutadiene or 1.4-dimethyl-butadiene may also be employed.

An excellent adhesive which may well be stored is obtained by preparing a solution of 40 parts of an interpolymerization product of vinyl chloride and vinyl ethyl ether in 60 parts of methacrylic acid methyl ester, to which about 0.1 per cent of methylamine is added as a stabilizing agent. 1 per cent of benzoyl peroxide is preferably added to the solution before use.

What we claim is:

1. A process of producing a stable adhesive which comprises dissolving the product obtained by the action of phosphorus oxychloride on natural rubber in monomeric styrene and stabilizing the solution by adding thereto from 0.1% to 5% of ethylamine.

2. A stable adhesive comprising about one part of phosphorus oxychloride treated natural rubber, about nine parts of monomeric styrene and from 0.01 to 0.5 part of ethylamine as a stabilizer.

3. A stable adhesive comprising phosphorus oxychloride treated natural rubber dissolved in monomeric styrene and from 0.1% to 5% of ethylamine as a stabilizer.

THEODOR DAUR.
WALTER DANIEL.